Patented June 20, 1933

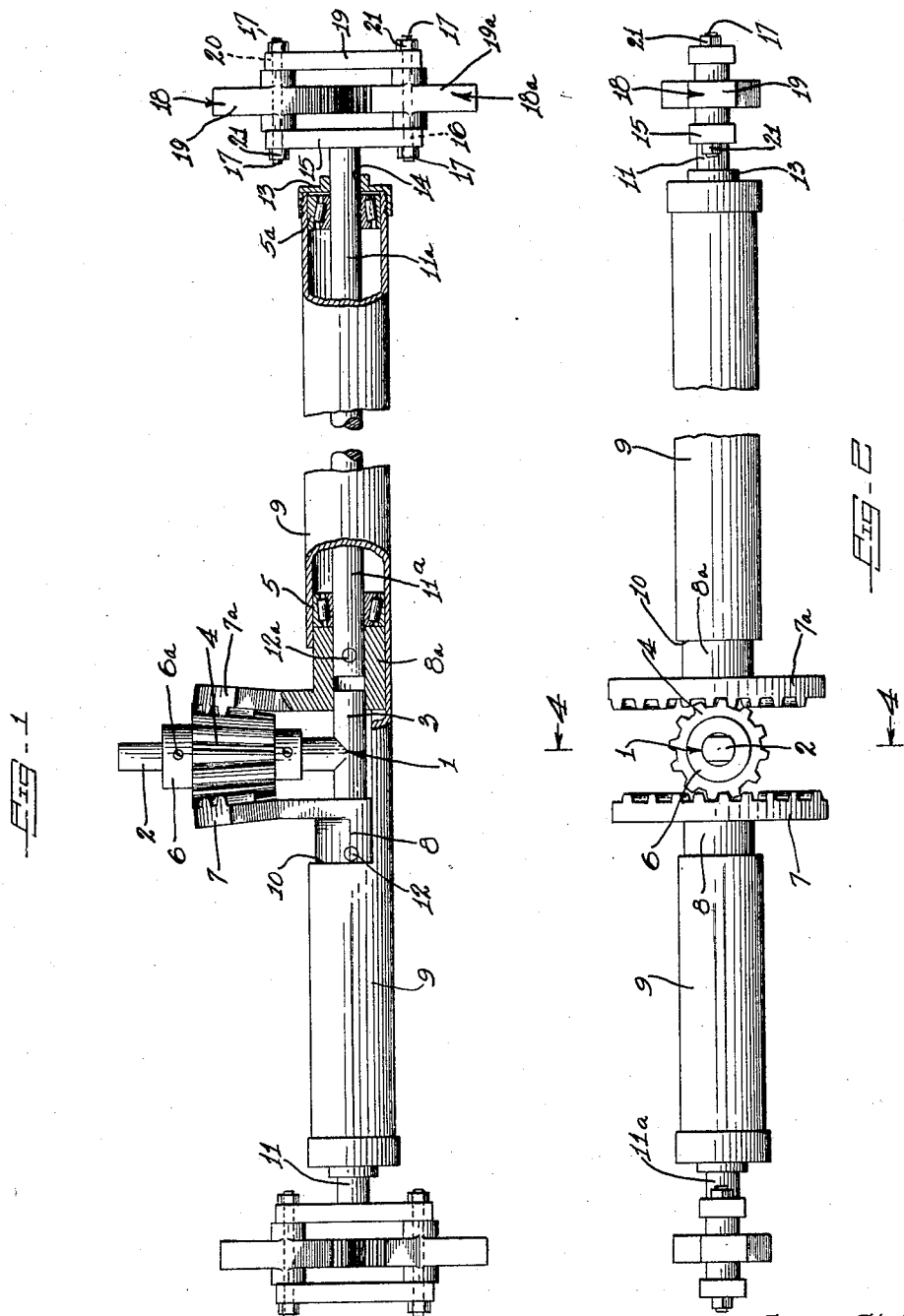

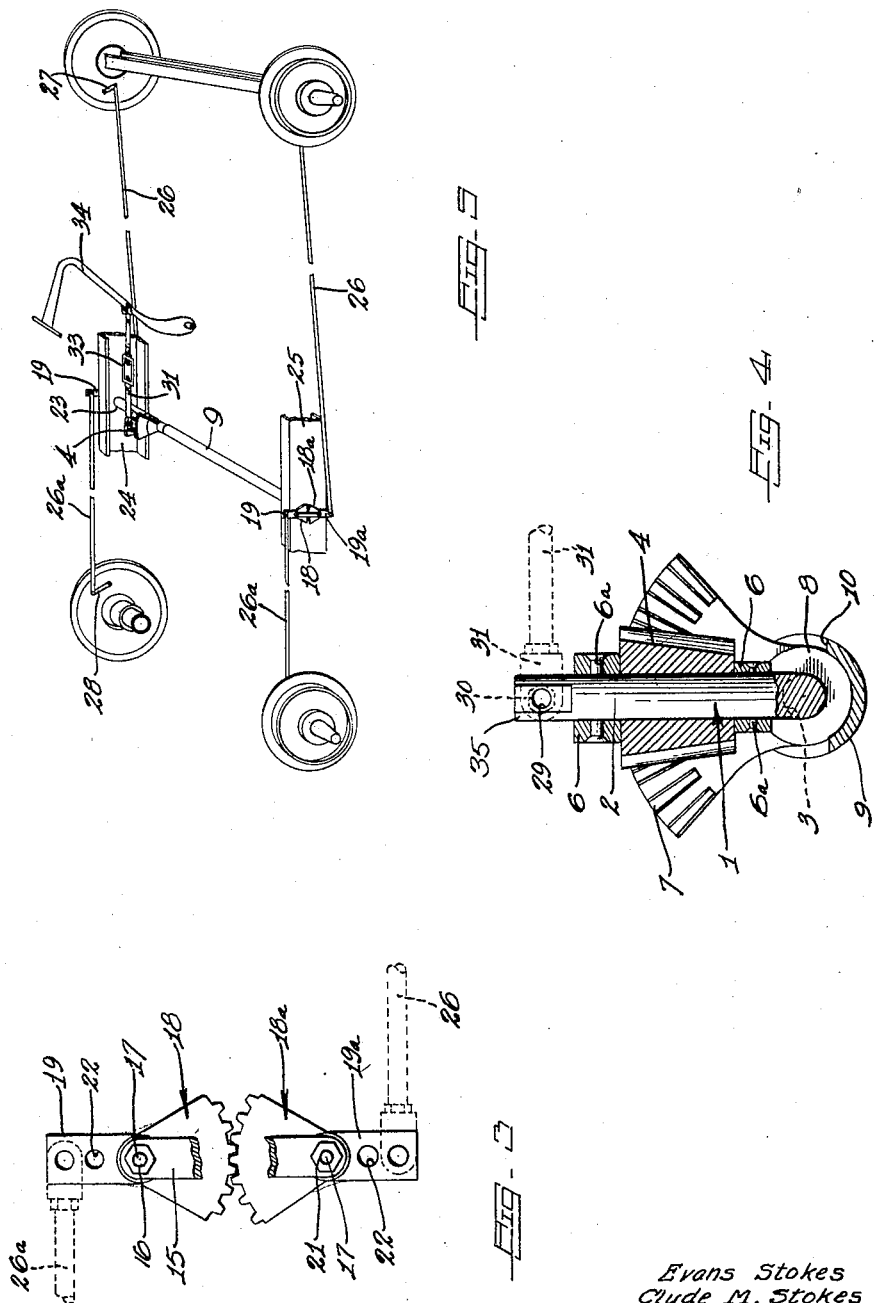

1,915,207

UNITED STATES PATENT OFFICE

EVANS STOKES AND CLYDE M. STOKES, OF ANNA, ILLINOIS

SELF-ADJUSTING EQUALIZER FOR BRAKES

Application filed July 6, 1931. Serial No. 548,998.

Our invention relates to improvements in self-adjusting equalizers for brakes, and it consists in the combinations, constructions, and arrangements herein described and claimed.

An object of our invention is to provide a self-adjusting equalizer for brakes which is particularly adapted for connection to four-wheel brakes.

A further object is to provide a device of the character described which will add to the efficiency and the life of the brake and at the same time, by rendering the braking action more uniform, will increase the useful life of the car, and more effectively safeguard the lives of its occupants.

A further object is to provide a device of the character described which may be rapidly and effectively operated even in extreme emergency without the application of undue force.

A further object is to provide a means whereby the tendency of a car to skid, especially on wet roads, may be overcome by reason of all the wheels of the car having their movement equally and automatically controlled.

Other objects and advantages will appear in the following specification, and the novel features of the invention will be particularly pointed out in the appended claims.

Our invention is illustrated in the accompanying drawings, forming part of this application, in which Figure 1 is a front elevational view of the device of our invention with portions partly broken away, Figure 2 is a plan view of the same, Figure 3 is an end elevational view of the gear segments employed at each end of our device, Figure 4 is a section taken substantially along the line 4—4 of Figure 2, and Figure 5 is a perspective view of the braking system of an automotive vehicle depicting a manner in which our invention may be connected thereto.

In carrying out our invention, we make use of a T shaft 1 consisting of a centrally disposed portion 2 and a cross portion 3 which are integral with each other. A pinion 4, which may be tapered as shown in Figure 1, is rotatably mounted on the portion 2 and may, if desired, be provided with roller bearing means and secured to the shaft by any suitable means, such as, for instance, collars 6 and screws 6a. On either side of the T shaft 1, we have provided gear segments 7 and 7a which are in engagement with the pinion 4. The gear segments 7 and 7a have integral collar portions 8 and 8a, respectively, which are rotatably mounted within a cylindrical casing 9 which is provided within an opening 10 through which the shaft portion 2 and the gear segments 7 and 7a extend.

It will be observed (see Figure 1) that the ends of the shaft portion 3 are rotatably mounted within the collar portions 8 and 8a and that the T shaft 1 and the gear segments 7 and 7a are free to move at right angles to the axis of the casing 9.

Within the casing 9 we have provided two brake shafts 11 and 11a which are fixedly secured at their inner ends to the collars 8 and 8a by any suitable means, such as, for instance, pins 12 and 12a.

All of the elements of our device to the left of the T shaft 1 have similar and equal counterparts on the right side of the T shaft 1 with the exception that one of the brake shafts may be made shorter in length than the other shaft in order that the T shaft 1 may be conveniently disposed. A detailed description of the elements on the left side of our device will therefore be unnecessary.

The shaft 11 is supported by roller bearing means 5 and 5a. The right end of the casing 9 is provided with an end cap 13 which is threadedly secured thereto and provided with a bearing 14 through which the shaft 11 extends.

The outer end of the shaft 11 may be provided with an integral cross arm 15 having openings 16 adapted for receiving bolts 17 upon which gear segments 18 and 18a may be rotatably mounted in a manner adapted to engage each other substantially as shown. Opposite the cross arm 15 is a cross piece 19 which is provided with openings 20 opposite the openings 16 and likewise adapted to receive the bolts 17. The bolts 17 may be provided with nuts 21 in order that the gear members 18 and 18a may be fixedly secured in their desired position relative to each other.

The gear segments 18 and 18a are provided with extensions 19 and 19a. Each of these extensions may have a plurality of spaced openings 22.

Now referring to Figure 5, it will be seen that the cylindrical casing 9 may extend through opposite aligned openings 23 in opposite frame portions 24 and 25, respectively. A front brake rod 26 may be pivotally connected in any suitable manner at one end to one of the projections 19a and at the other end to a brake band lever 27 in a manner well known in the art. The upper extension 19 may be similarly connected by a rear brake rod 26a to a brake band lever 28.

Now referring to Figure 4, it will be seen that the upper portion 35 of the T shaft 1 may be provided with an opening 29 for receiving a bolt means 30 which engages a connecting member 31. The member 31 is threadedly secured to connecting turnbuckle means 33 which is pivotally connected to a brake lever 34.

From the foregoing description of the various parts of our device, the operation thereof may be readily understood. It is apparent that when the brake lever 34 is pushed forward, the front brake rods 26 and the rear brake rods 26a move inwardly in a manner adapted to tighten the front and rear brake bands of the car with an equal pressure. The braking pressure is applied on the right side through the T shaft 1, the pinion 4, the gear segment 7, the brake shaft 11, the cross arm 15, the bolts 17, the gear segments 18 and 18a, to the brake rods 26 and 26a, to the brake band levers 27 and 28.

The pressure is applied on the left side of the T shaft 1 in a similar manner. It is apparent that an equal amount of pressure will be applied on the right and left side of the car or automotive vehicle in such a manner that a minimum amount of strength is necessary to bring the vehicle to a stop.

Particular attention is directed to the fact that the pinion 4, and the brake shaft 11 are prevented from jamming or sticking by the employment of roller bearing means. We also consider it a special advantage of our invention that by twisting the turnbuckle 33, the brakes may be all adjusted at the same time without the driver necessarily leaving the vehicle.

We claim:

1. A brake equalizer construction for motor vehicles of the character described adapted to be mounted on the frame of the chassis of the motor vehicle and extend through the chassis frame on either side thereof, said construction comprising a rigid elongated tubular sleeve member having an open portion intermediate of its ends, a differential means movably mounted within said sleeve adjacent the open portion and projecting through the open portion and being pivotally movable in a plane at right angles to the axis of the sleeve member, and shafts rigidly connected to opposite sides of said differential means and being rotatably mounted in said sleeve member and projecting beyond the outer ends of said sleeve member, each of said shafts being provided at their outer ends with pivotally mounted equalizing means and with rigid extensions whereby each of the equalizing means may be operatively connected to the brake band of the motor vehicle.

2. A brake equalizer construction for motor vehicles of the character described adapted to be mounted on the frame of the chassis of the motor vehicle and extend through the chassis frame on either side thereof, said construction comprising a rigid elongated tubular sleeve member having an open portion intermediate of its ends, a differential means movably mounted within said sleeve adjacent the open portion and projecting through the open portion and being pivotally movable in a plane at right angles to the axis of the sleeve member, shafts rigidly connected to opposite sides of said differential means and being rotatably mounted in said sleeve member and projecting beyond the outer ends of said sleeve member, each of said shafts being provided at their outer ends with pivotally mounted equalizing means and with rigid extensions whereby each of the equalizing means may be operatively connected to the brake band of the motor vehicle, said differential means comprising oppositely disposed gear segments pivotally mounted in said sleeve member and extending through said open portion, and a T-shaft pivotally secured to said segments and having mounted thereon a pinion operatively connected to each of said gear segments.

3. A brake equalizer construction for motor vehicles of the character described adapted to be mounted on the frame of the chassis of the motor vehicle and extend through the chassis frame on either side thereof, said construction comprising a rigid elongated tubular sleeve member having an open portion intermediate of its ends, a differential means movably mounted within said sleeve adjacent the open portion and projecting through the open portion and being pivotally movable in a plane at right angles to the axis of the sleeve member, shafts rigidly connected to opposite sides of said differential means and being rotatably mounted in said sleeve member and projecting beyond the outer ends of said sleeve member, each of said shafts being provided at their outer ends with pivotally mounted equalizing means and with rigid extensions whereby each of the equalizing means may be operatively connected to the brake band of the motor vehicle, said differential means comprising oppositely disposed gear segments pivotally mounted in said sleeve member and extending through said open portion, and a T-shaft pivotally secured to said segments and having mounted thereon a pinion operatively connected to each of said gear segments, said T-shaft being adapted to be moved pivotally by the brake lever of the motor vehicle.

4. A brake equalizer construction for motor vehicles of the character described adapted to be mounted on the frame of the chassis of the motor vehicle and extend through the chassis frame on either side thereof, said construction comprising a rigid elongated tubular sleeve member having an open portion intermediate of its ends, a differential means movably mounted within said sleeve adjacent the open portion and projecting through the open portion and being pivotally movable in a plane at right angles to the axis of the sleeve member, and shafts rigidly connected to opposite sides of said differential means and being rotatably mounted in said sleeve member and projecting beyond the outer ends of said sleeve member, each of said shafts being provided at their outer ends with pivotally mounted equalizing means and with rigid extensions whereby each of the equalizing means may be operatively connected to the brake band of the motor vehicle, each of said shafts being adapted to extend through and be pivotally mounted on the frame of the motor vehicle chassis and being in substantial alignment with each other by reason of their being rotatably supported at their inner ends within said sleeve member.

5. A brake equalizer construction for motor vehicles of the character described adapted to be mounted on the frame of the chassis of the motor vehicle and extend through the chassis frame on either side thereof, said construction comprising a casing having an open portion intermediate its ends, a differential means movably mounted within said casing adjacent said open portion of the same and projecting therethrough and being pivotally movable in a plane at right angles to the longitudinal axis of the casing, said differential means comprising oppositely disposed gear segments having integral sleeve portions movably mounted in the casing and a T-shaft pivotally mounted in the sleeve portions of each of said segments and having mounted on said T-shaft a pinion intermediate of said gear segments and operatively connected thereto, and shafts rigidly connected at their inner ends to one of said sleeve portions and having their outer ends extending beyond said casing and being provided with pivotally mounted intermeshing gear segments, said gear segments being provided with a connection to the brake band of the motor vehicle.

6. A brake equalizer construction for motor vehicles of the character described adapted to be mounted on the frame of the chassis of the motor vehicle and extend through the chassis frame on either side thereof, said construction comprising a casing having an open portion intermediate its ends, a differential means movably mounted within said casing adjacent said open portion of the same and projecting therethrough and being pivotally movable in a plane at right angles to the longitudinal axis of the casing, said differential means comprising oppositely disposed gear segments having a integral sleeve portions movably mounted in the casing and a T-shaft pivotally mounted in the sleeve portions of each of said segments and having mounted on said T-shaft a pinion intermediate of said gear segments and operatively connected thereto, and shafts rigidly connected at their inner ends to one of said sleeve portions and having their outer ends extending beyond said casing and being provided with pivotally mounted intermeshing gear segments, said gear segments being provided with a connection to the brake band of the motor vehicle, each of said shafts being held in substantial alignment with each other and having their inner ends supported by the sleeve portions of the oppositely disposed gears, the sleeve portions of said gears and said T-shaft being supported by said casing.

EVANS STOKES.
CLYDE M. STOKES.